(12) United States Patent
Satoh (10) Patent No.: US 6,471,756 B1
(45) Date of Patent: Oct. 29, 2002

(54) BUBBLE-REMOVING APPARATUS

(75) Inventor: Kanji Satoh, Tokyo (JP)

(73) Assignee: Satoh Jushi Kogyo Co., Ltd. (JP)

( * ) Notice: Subject to any disclaimer, the term of this patent is extended or adjusted under 35 U.S.C. 154(b) by 68 days.

(21) Appl. No.: 09/716,063

(22) Filed: Nov. 17, 2000

(30) Foreign Application Priority Data

Nov. 18, 1999 (JP) .......................................... 11-327715

(51) Int. Cl.[7] ............................................. B01D 19/00
(52) U.S. Cl. ............................. 96/165; 96/167; 96/171
(58) Field of Search ........................... 96/165, 167, 171

(56) References Cited

U.S. PATENT DOCUMENTS

| | | | |
|---|---|---|---|
| 2,061,517 A | * | 11/1936 | Kenny |
| 2,401,079 A | * | 5/1946 | Jones et al. |
| 2,496,467 A | * | 2/1950 | Griffith |
| 2,811,219 A | * | 10/1957 | Wenzl |
| 2,913,068 A | * | 11/1959 | Mistarz et al. |
| 3,163,508 A | | 12/1964 | Tuck et al. |
| 3,282,030 A | * | 11/1966 | Griffo et al. |
| 3,359,708 A | * | 12/1967 | Barber |
| 4,617,827 A | * | 10/1986 | Gronke |

FOREIGN PATENT DOCUMENTS

JP        11-19406        1/1999

* cited by examiner

Primary Examiner—Duane S. Smith
(74) Attorney, Agent, or Firm—Adams & Wilks (57) ABSTRACT

A bubble-removing apparatus has a main body having a central axis, a main chamber, an inflow port for introducing a fluid containing entrained bubbles tangentially into the main chamber so that the fluid is caused to rotate in the main chamber about the central axis to cause the bubbles to separate from the fluid and collect around the central axis, an outflow port for discharging the fluid, and a discharge outlet for discharging the bubbles separated from the fluid. A valve chamber is disposed between the discharge outlet and the main chamber, and a block member is disposed in the valve chamber and has a through-hole in fluid communication with the main chamber. A float member is disposed over the block member and undergoes movement within the valve chamber in response to changes in internal pressure within the main chamber to place the through-hole of the block member into and out of fluid communication with the discharge outlet to thereby control the discharge of the bubbles from the discharge outlet.

33 Claims, 5 Drawing Sheets

BUBBLE-REMOVING APPARATUS

BACKGROUND OF THE INVENTION

1. Field of the Invention

The present invention relates to a bubble-removing apparatus, and more particularly to an apparatus for removing bubbles entrained in a liquid such as industrial water, oil and chemical solutions.

2. Background Information

Various fluids are used for various purposes. In such use, inconvenience is often caused when bubbles are entrained in the fluids. For example, during a cleaning step of a semiconductor production process, a cleaning solution consisting of acid-based chemicals or alkaline-based chemicals contained in a constant mixing ratio is circulated in a cleaning bath in a predetermined amount to conduct automatic cleaning of semiconductor substrates. In this case, in order to realize the cleaning effects with good stability and reproducibility, it is important to maintain a constant mixing ratio of chemicals, and for this purpose, a stable supply of chemicals in a predetermined amount is required. The bubbles entrained in a liquid of the kind described must be removed therefrom because they cause damage to equipment, increase compressibility of the liquid, cause vibration and noise, result in poor product quality, and cause deterioration and change in the quality of the liquid.

Various methods have been used for measuring a supplied amount of a cleaning solution which is supplied automatically. Recently, an ultrasonic flow meter having the advantages of facilitating miniaturization of a measurement apparatus and varying pressure has been widely used. This ultrasonic flow meter has the further advantage that the supplied amount of cleaning solution can be readily changed and the mixing ratio of chemicals can thereby be simply adjusted automatically. However, the ultrasonic flow meter is susceptible to the influence of bubbles in the cleaning solution, and accurate measurement can not be made without eliminating the bubbles. These bubbles are formed, for example, during a change of canisters containing chemicals or during operation of the pump (e.g., a diaphragm pump). For this reason, various types of conventional bubble-removing apparatuses have been proposed and employed. However, in many cases, when bubbles are discharged, the solution is entrained in the bubbles and are both discharged together in a large amount. Furthermore, with such conventional bubble-removing apparatuses, additional equipment, such as a suction pump or a tank, must be provided to insure proper liquid/gas separation and subsequent discharge of the gas, thereby increasing the overall size of the apparatus. Accordingly, an operation where only a small amount of cleaning solution is discharged can not be achieved.

A bubble-removing apparatus has been known in which a liquid is fluidized by mixing it (e.g., by rotation) in a vessel and the bubbles are collected at the central portion for removal in order to use the apparatus even when the flow amount is small. For example, one such apparatus is disclosed in JP-A-11-19406. According to the disclosure in JP-A-11-19406, the bubble-removing apparatus can be used even in a case where the flow amount of liquid is low, and the apparatus is constructed to separate bubbles and collect the bubbles towards the central axis of a vessel by a rotating flow and to discharge the bubbles through a discharge outlet provided at the central axis of the vessel. At the discharge outlet of this apparatus, an automatic ON-OFF valve is disposed. The ON-OFF valve has a mechanism wherein a spherical discharge valve float is raised by the buoyancy of the liquid to shut the discharge outlet, and when bubbles are collected, the discharge valve float is released by its own weight and a spring to discharge the bubbles through the outlet.

However, in the case of the automatic ON-OFF valve of the abovementioned apparatus, since it is necessary to use the spring to securely open the discharge outlet when the liquid comprises chemicals such as acid or alkali, it is difficult to maintain a stable performance for a long period of time. Further, operation of the valve varies depending upon the balance of, for example, the discharge valve float's own weight, the spring force of the spring and the buoyancy of the discharge valve float. Accordingly, when the internal pressure inside the vessel largely changes by the flow amount of the liquid which flows into the vessel, the operation of the valve can not accurately follow the change. For this reason, with such type of apparatus alone, it has not been possible to treat a liquid which is to be used for the case where the flow amount is widely varied.

A bubble-removing apparatus has been known wherein an air vent which has a ball element instead of a spring is disposed at the discharge outlet. However, in such apparatus, the ball element is unstable, and when the flow amount increases, the ball element will float in the air vent and the liquid will flow out together with the bubbles. Further, when the ball element is raised and shuts the discharge outlet of the air vent, the liquid containing bubbles will flow out from the outflow port of the bubble-removing apparatus, thereby preventing the removal of bubbles. In addition, since the ball element has a spherical surface, when the ball element moves only a little, the liquid flows into the air vent and the air vent becomes filled with the liquid, whereby the ball is made further unstable and it becomes difficult to keep balance with the flow amount.

Further, a pump is used in order to permit the liquid to flow into a cleaning bath or the like through the above bubble removing apparatus. Usually, however, the pump does not necessarily create a constant pressure at all times. Particularly, with diaphragm pumps, air-actuated pumps and the like, the pressure can not be kept constant and pulsations are generated, whereby the flow amount becomes unstable due to transfer of such pulsations. As a result, problems may sometimes arise when the above liquid is used, for example, in a subsequent cleaning step.

SUMMARY OF THE INVENTION

It is an object of the present invention to provide a bubble-removing apparatus for removing bubbles entrained in a fluid regardless of the flow amount of fluid or a fluctuation in the flow amount.

Another object of the present invention is to provide a bubble-removing apparatus by which bubbles entrained in a fluid can be removed from a bubble discharge outlet without permitting the fluid to flow out from the discharge outlet.

Another object of the present invention is to provide a bubble-removing apparatus which does not require additional equipment, such as a suction pump or a tank, for the effective removal of bubbles from a liquid and the subsequent discharge of the bubbles.

Still a further object of the present invention is to provide a bubble-removing apparatus by which the internal pressure can be controlled and by which pulsations of fluid flowing out from a discharge outlet can be buffered while bubbles are removed from the fluid.

The foregoing and other objects of the present invention are carried out by a bubble-removing apparatus comprising a main body having a main chamber comprised of a first chamber portion, a second chamber portion and a third chamber portion connecting the first chamber portion in fluid communication with the second chamber portion. A stationary rod or bar is disposed in the main chamber along a central axis thereof. At least one inflow port is disposed in the main body for introducing a fluid containing entrained bubbles tangentially into the main chamber so that the fluid is caused to rotate in the first, second and third chamber portions about the central axis of the main chamber to thereby cause the bubbles to separate from the fluid and collect around the bar.

The main body has an outflow port for discharging the fluid whose entrained bubbles have been separated, and a discharge outlet for discharging the bubbles separated from the fluid. A valve chamber is disposed between the discharge outlet and the first chamber portion of the main chamber. A block member is disposed in the valve chamber and has a through-hole in fluid communication with the first chamber portion of the main chamber. A float member is disposed in the valve chamber for undergoing movement therein relative to the block member. The float member is disposed over the block member so that a first gap is formed between an outer surface of the block member and an inner surface of the float member, and a second gap is formed between an outer surface of the float member and an inner surface of the valve chamber. The float member undergoes movement within the valve chamber in response to an increase in internal pressure within the main chamber during rotation of the fluid and separation of the bubbles from the fluid. Movement of the float member within the valve chamber places the through-hole of the block member into and out of fluid communication with the discharge outlet through the first and second gaps to thereby control discharge of the bubbles through the discharge outlet.

Preferably, the first and third chamber portions are generally cylindrical-shaped and the second chamber portion has a generally inverted conical shape. A diameter of the first chamber portion is preferably greater than that of the third chamber portion.

The block member is preferably cylindrical shaped and is integral with a substrate for engaging an upper end of the first chamber portion. The float member preferably comprises a cylindrical wall surrounding the block member and an upper plate closing an upper end of the cylindrical wall. During movement of the float member within the valve chamber, the upper plate of the float member opens and closes an open end of the through-hole of the block member to place the discharge outlet into and out of fluid communication with the first chamber portion of the main chamber through the first and second gaps.

In one embodiment, a ring member is disposed in the valve chamber between the outer surface of the float member and an inner surface of the valve chamber so that the second gap is disposed between the outer surface of the float member and an inner surface of the ring member, and a third gap is formed between an outer surface of the ring member and the inner surface of the valve chamber. The ring member undergoes movement within the valve chamber in response to a change in internal pressure in the second gap.

The cylindrical wall of the float member has an inner diameter greater than an outer diameter of the block member so that the first gap is formed between the outer surface of the block member and the inner surface of the float member. The width of each of the first, second and third gaps in the diametrical direction thereof is selected so that the bubbles separated from the fluid can efficiently pass therethrough while substantially preventing the fluid from which the entrained bubbles have been separated from passing therethrough. Preferably, the dimension of the gaps is from about 0.05 mm to 0.3 mm, and more preferably from about 0.1 mm to 0.2 mm, when the fluid containing entrained bubbles comprises a water-type fluid. When the fluid containing entrained bubbles comprises an oil-type fluid, the dimension of the gap is preferably from about 0.2 mm to 1 mm, and more preferably from about 0.5 mm to 0.8 mm.

The range of movement of the float member within the valve chamber is limited by the distance between an upper surface portion of the block member and an inner upper surface of the valve chamber. When fluid does not enter the through-hole of the block member from the first chamber portion of the main chamber, a lower surface of the upper plate of the float member abuts the upper surface portion of the block member to close the open end of the through-hole of the block member. When fluid enters the through-hole of the block member, pressure generated by the fluid causes the float member to move away from the block member to open the open end of the through-hole of the block member and place the discharge outlet in fluid communication with the first chamber portion of the main chamber through the gaps. When the pressure generated by the fluid is sufficiently high, the float member is caused to move away from the block member until an upper surface of the upper plate of the float member abuts the inner upper surface of the valve chamber and closes the discharge outlet. The distance between the upper surface portion of the block member and the inner upper surface of the valve chamber is selected so that when the upper surface of the upper plate of the float member abuts the inner upper surface of the valve chamber, the float member does not come away from the block member (i.e., the float member remains positioned over the block member).

According to the present invention, in a condition in which the pressure generated by the fluid is sufficient to cause the float to move away from the block member but not sufficient to bring the upper surface of the upper plate of the float member into abutment with the inner upper surface of the valve chamber, only the bubbles separated from the fluid are permitted to pass through the gaps and discharged through the discharge outlet. The range of movement of the float member in this condition is preferably from 1 mm to 5 mm, and more preferably 1 mm to 3 mm, measured from the inner upper surface of the valve chamber and the upper surface of the upper plate of the float member.

BRIEF DESCRIPTION OF THE DRAWINGS

The foregoing summary, as well as the following detailed description of the preferred embodiments of the invention, will be better understood when read in conjunction with the accompanying drawings. For the purpose of illustrating the invention, there is shown in the drawings embodiments which are presently preferred. It should be understood, however, that the invention is not limited to the precise arrangement and instrumentalities shown. In the drawings:

FIGS. 3(A) to 3(C) are partial sectional views illustrating the operation of a float member and showing enlarged views of narrow gaps for purposes of explanation only, where FIG. 3(A) illustrates the case where the float member is at its lowermost position, FIG. 3(B) illustrates the case where the float member is being raised, and FIG. 3(C) illustrates the case where the float member is at its uppermost position;

DETAILED DESCRIPTION OF THE PREFERRED EMBODIMENTS

While this invention is susceptible of embodiments in many different forms, this specification and the accompanying drawings disclose only preferred embodiments of the invention. The invention is not intended to be limited to the embodiments so described, and the scope of the invention will be pointed out in the appended claims.

Figure 1:
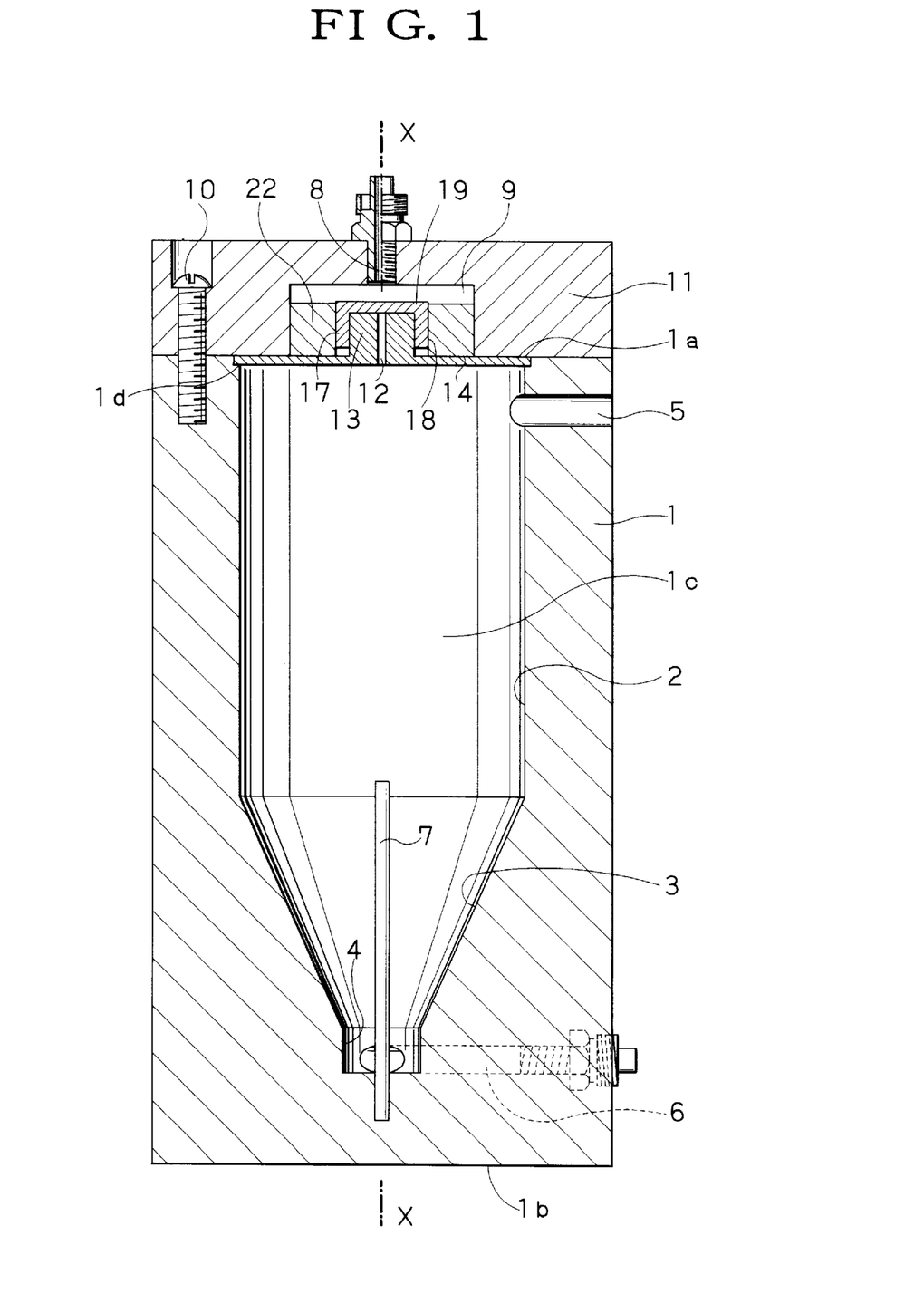
FIG. 1 is a partial sectional view of a bubble-removing apparatus according to the present invention.
Figure 2:
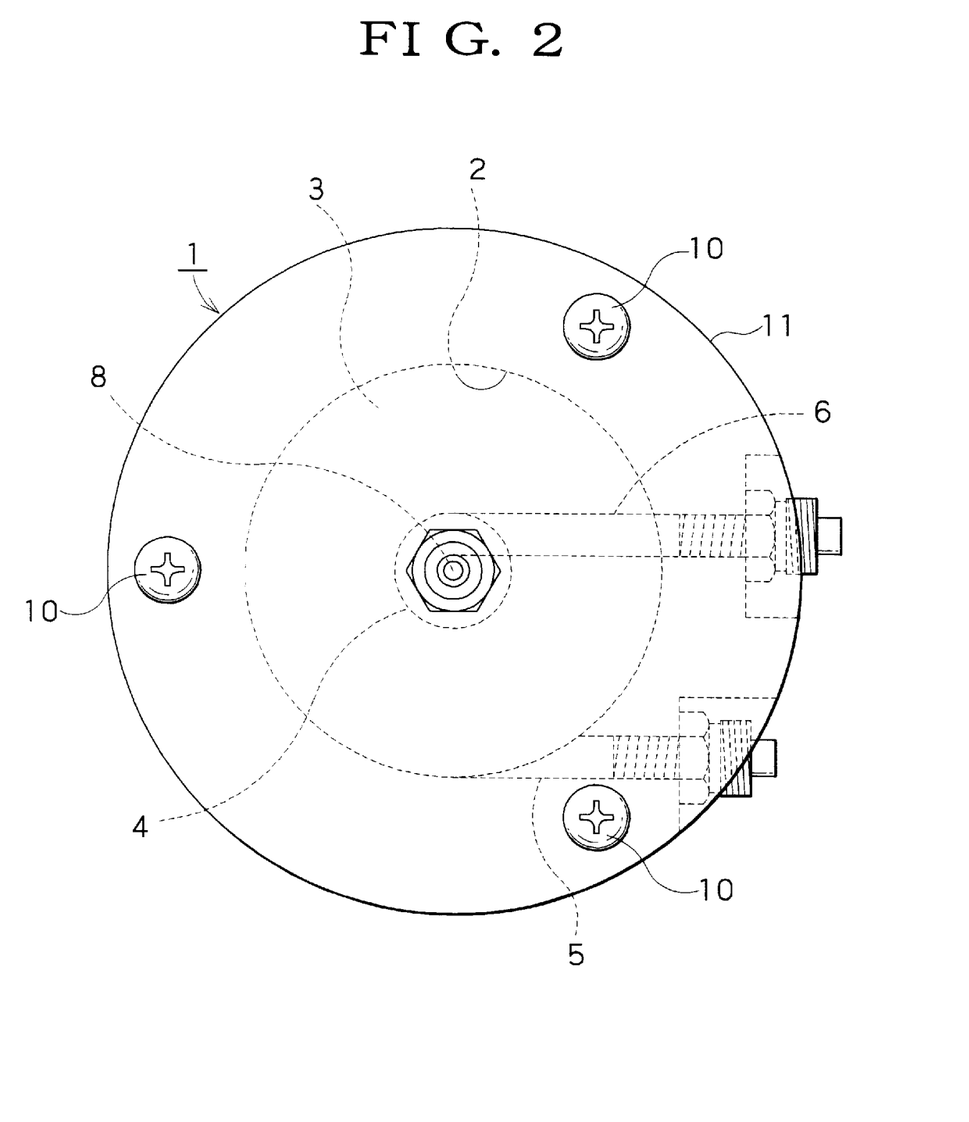
FIG. 2 is a plane view of the bubble-removing apparatus according to the present invention.

FIG. 1 and FIG. 2 are a partial sectional view and a plane view, respectively, showing an embodiment of a bubble-removing apparatus according to the present invention. The bubble-removing apparatus has a generally cylindrical main body 1 having an open upper end 1a, a closed lower end 1b and an upright main chamber 1c disposed between the open and closed ends. The main chamber 1c comprises a main chamber portion or inflow space 2, a second chamber portion or outflow space 4, and a third chamber portion 3 connecting the inflow space 2 in fluid communication with the outflow space 4. The third chamber portion 3 has a generally inverted conical shape which, as shown in FIG. 1, converges toward the outflow space 4. The inflow space 2 and the outflow space 4 are generally cylindrical-shaped, and the inflow space 2 has a diameter greater than that of the outflow space 4.

An inflow port 5 is disposed in the main body 1 in fluid communication with the inflow space 2 for introducing a fluid containing entrained bubbles into the inflow space 2 in a tangential direction of the inflow space 2. An outflow port 6 is disposed in the main body 1 in fluid communication with the outflow space 4 for discharging fluid, from which entrained bubbles have been separated, in a tangential direction of the outflow space 4. By disposing the inflow port 5 and the outflow port 6 on the main body 1 so that introduction and discharge of fluid is tangential to the inflow space 2 and the outflow space 4, respectively, a uniform rotating flow is obtained by the combined form of the cylindrical-shaped inflow space 2 and outflow space 4 and the conical shape of the third chamber portion 3 to form an aggregation of bubbles on a central vertical axis X passing through the inflow space 2, the third chamber portion 3 and the outflow space 4.

A stationary rod or bar 7 is disposed in the main chamber and extends along the vertical axis X. Although not shown, the bar 7 is integrated with the main body 1 via a screw connection or other suitable connecting means. when a fluid containing entrained bubbles is caused to flow tangentially into the inflow space 2 with a predetermined velocity through the inflow port 5, a uniform rotating flow of the fluid is obtained in the main chamber 1c. The rotating flow causes the bubbles entrained in the fluid to separate from the fluid, flow toward the center of the flow and collect around the bar 7, thereby forming an aggregation of bubbles along the vertical axis X. The bubbles which collect around the bar 7 merge with one another and combine to form larger bubbles which, due to the lighter weight of the bubbles as compared to the fluid and the rotating flow of the fluid which creates a region of reduced pressure along the vertical axis X, rise along the bar 7 and along the vertical axis X in the upright main chamber 1c and gather at an upper portion of the inflow space 2. At this time, since the bubbles collect to form a core in the form of a narrow column extending along the vertical axis X, the core of bubbles is not swung outwardly toward an inner wall surface of the main chamber 1c by the rotating flow of the fluid, and the bubble core becomes more stable as the bubbles are raised along the vertical axis X. On the other hand, the fluid from which the bubbles have been separated collects as a rotating fluid layer in the region of the inner circumferential surface of the main chamber 1c and is directed towards the outflow port 6 by the conical shaped third chamber portion 3. It is understood that if the diameter of the bar 7 is increased, the volume of the outflow space 4 is decreased. As a result, the internal pressure in the main chamber 1c increases and the rise of the bubbles can be accelerated. The same effect can be obtained if the outflow port 6 has an inner diameter smaller than that of the inflow port 5.

In the embodiment shown in FIGS. 1–2, only one inflow port 5 is disposed in the main body 1 in fluid communication with the inflow space 2 for introducing a fluid containing entrained bubbles into the inflow space 2. Alternatively, a plurality of inflow ports 5 may be disposed in the main body 1 in fluid communication with the inflow space 2 for introducing the fluid containing entrained bubbles in a tangential direction of the inflow space. When the viscosity of the fluid is high, by permitting the fluid to flow into the inflow space 2 through the inflow ports 5, the flow amount and rotation of the fluid can be increased, whereby the bubbles entrained in the fluid can easily collect around the bar 7 and the vertical axis X.

A generally cylindrical-shaped cover member 11 is connected to the upper end 1a, of the main body 1 by screws 10 or other suitable fasteners. The cover member 11 may also be welded to the main body 1 after connection with the screws 10 to provide further integration. An appropriate packing material (not shown) may be disposed between the main body 1 and the cover member 11 to provide a seal therebetween.

The cover member 11 has a discharge outlet 8 disposed at an upper portion thereof and extending along the vertical axis X for discharging the bubbles which separate from the fluid and collect around the bar 7 and the vertical axis X. A valve chamber 9 is formed in the cover member 11 and is disposed between the discharge outlet 8 and the inflow space 2 when the cover member 11 is connected to the upper end 1a of the main body 1. As shown in FIG. 1, a generally cylindrical-shaped block member 13 is disposed in the valve chamber 9 and has a through-hole 12 having a lower open end 12a in fluid communication with the upper portion of the inflow space 2 and an upper open end 12b opening to an upper surface portion 13a of the block member 13. The block member 13 has a base 14 having a peripheral portion resting on a peripheral shoulder id disposed at the upper end 1a, of the main body 1. When the cover member 11 is attached to the main body 1, the peripheral portion of the base 14 is clamped between the cover member 11 and the peripheral shoulder 1d of the main body 1.

Figure 5:
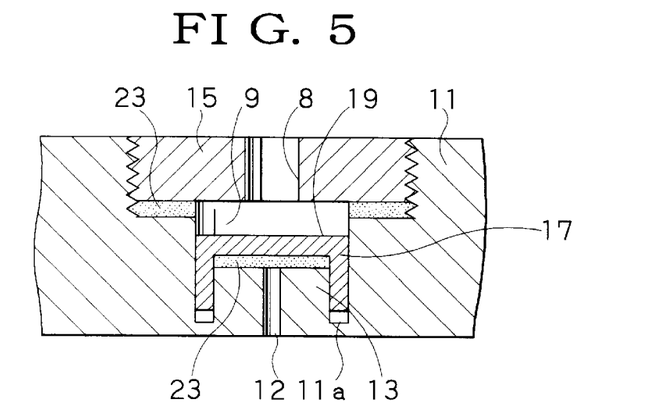
FIG. 5 is a partial sectional view showing a still another example of a valve chamber of the bubble-removing apparatus according to the present invention.
Figure 6:
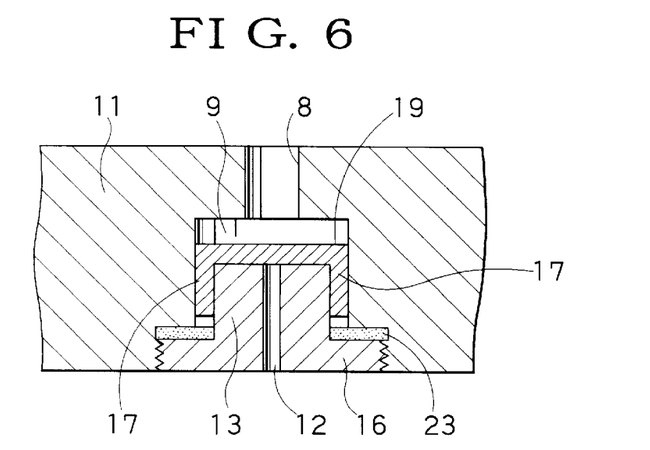
FIG. 6 is a partial sectional view showing a further example of a valve chamber of the bubble-removing apparatus according to the present invention.

In another embodiment, as shown in FIG. 5, the block member 13 may be formed as a unitary structure (i.e., formed in one piece) with the cover member 11, and a fixing plate 15 having the discharge outlet 8 may be screwed to the cover member 11. In yet another embodiment, as shown in FIG. 6, a fixing plate 16 formed as a unitary structure with the block member 13 may be screwed to the cover member 11.

Referring back to FIGS. 1 and 3(A)–3(C), a float member 17 is disposed in the valve chamber 9 for undergoing movement (i.e., upward and downward movement as shown in FIGS. 1 and 3(A)–3(C)) therein relative to the block member 13. A ring member 22 is disposed in the valve chamber 9 spaced apart from and concentric with the block member 13. The ring member 22 is also spaced apart from an inner side surface 9a of the valve chamber 9 to define a gap 21 therebetween. The float member 17 is disposed over the block member 13 so that a gap 24 is formed between an outer surface of the block member 13 and an inner surface of the float member 17, and a gap 20 is formed between an outer surface of the float member 17 and an inner surface of the ring member 22. The float member 17 undergoes up-and-down movement within the valve chamber 9 in response to a change in internal pressure due to the rotating flow of the fluid in the main chamber 1c. Movement of the float member 17 within the valve chamber 9 places the through-hole 12 of the block member 13 in fluid communication with the discharge outlet 8 (FIG. 3(B)) through the gaps 20, 24 and out of fluid communication with the discharge outlet 8 (FIGS. 3(A), 3(C)) to thereby control discharge of the bubbles through the discharge outlet 8.

The ring member 22 is also disposed in the valve chamber 9 for undergoing up-and-down movement within the valve chamber in response to a change in internal pressure in the gap 20. As the internal pressure in the gap 20 increases, the ring member 22 moves upward. As further described below, upward movement of the ring member 22 allows bubbles passing through the through-hole 12 of the block member 13 to flow through the gap 21.

In the present embodiments, the float member 17 is generally cap-shaped and comprises a cylindrical wall 18 surrounding the block member 13 and an upper plate 19 closing an upper end of the cylindrical wall 18. The float member 17 has an inner diameter which is greater than an outer diameter than the block member 13 so that the gap 24 is provided therebetween when the float member 17 is disposed over the block member 13. The height of the cylindrical wall 18 is selected so that when the upper plate 19 is seated on the upper surface portion 13a of the block member 13 to close the upper open end 12b of the through-hole 12, a lower end of the cylindrical wall 18 does not abut the base 14 (FIG. 3(B)), a base portion 11a of the cover member 11 (FIG. 5) or the fixing plate 16 (FIG. 6).

Figure 3A:
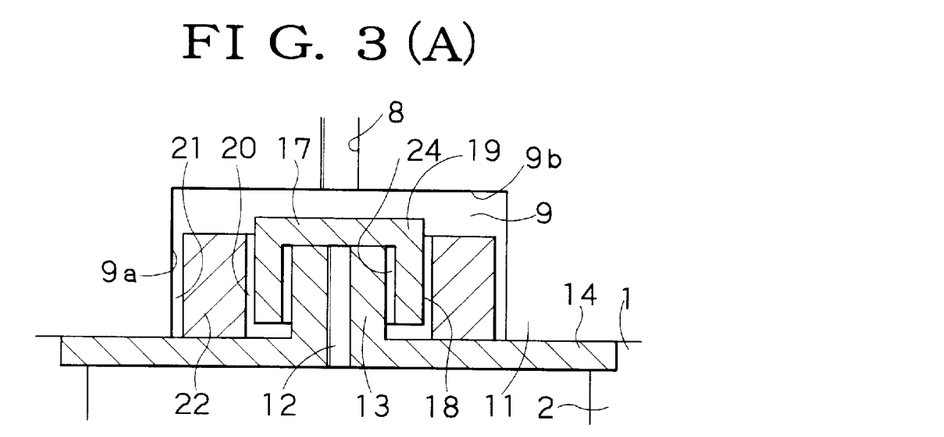
Figure 3B:
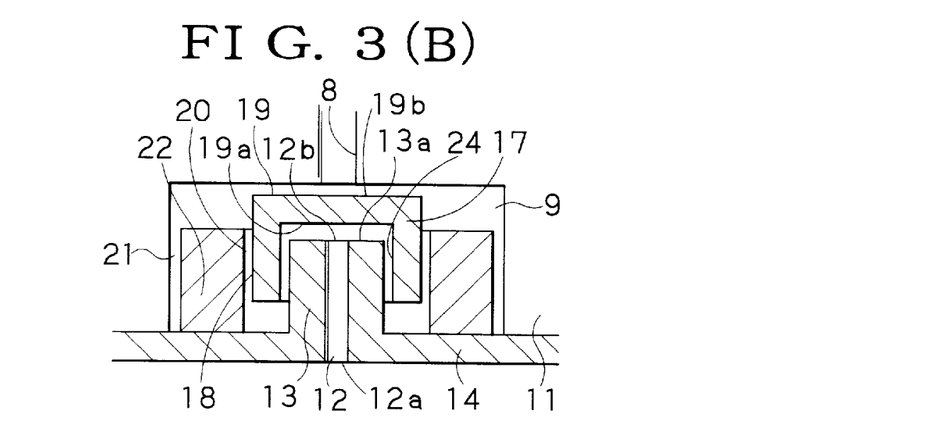
Figure 3C:
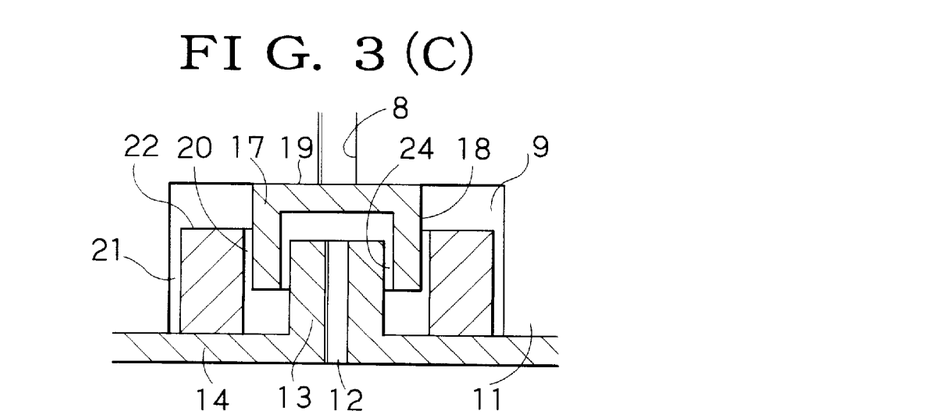
Figure 4:
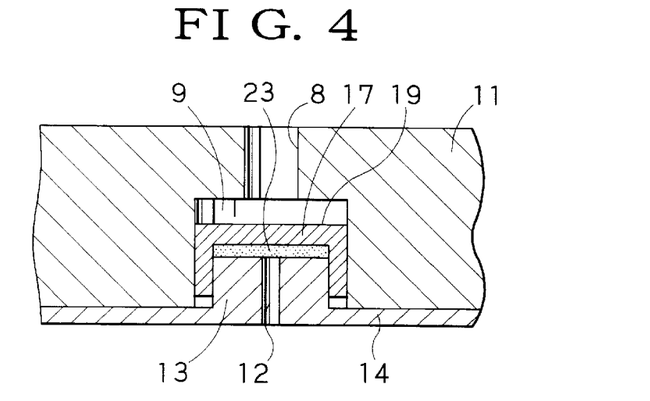
FIG. 4 is a partial sectional view showing another example of a valve chamber of the bubble-removing apparatus according to the present invention.

While in the embodiment of FIGS. 1, 2 and 3(A)–3(C) the ring member 22 is disposed in the valve chamber 9, such ring member may be omitted, as shown in the embodiments of FIGS. 4–6. In this case, a gap (not shown) similar to the gap 20 in FIGS. 3(A)–3(C) is formed between the outer surface of the float member 17 and an inner side surface of the valve chamber 9, and a gap (not shown) similar to the gap 24 is formed between the outer surface of the block member 13 and the inner surface of the float member 17. Furthermore, a sealing member for providing a fluid-tight seal may be disposed at various positions in the valve chamber 9. For example, a sealing member comprised of a packing material 23 is preferably disposed on a lower surface 19a of the plate 19 of the float member 17 (FIGS. 4–5) to provide a fluid-tight seal between the through-hole 12 of the block member 13 and the gap between the outer surface of the block member 13 and the inner surface of the float member 17 when the float member 17 is seated on the upper surface portion 13a of the block member 13. In the embodiment shown in FIG. 5 a packing member 23 is also preferably disposed between the fixing plate 15 and the cover member 11. In the embodiment shown in FIG. 6, a packing member 23 is preferably disposed between the cover member 11, the block member 13 and the fixing plate 16.

According to the present invention, the width (i.e., dimension in the radial direction) of the gaps 20, 21 and 24 is sufficiently narrow so that the bubbles separated from the fluid can be efficiently passed therethrough while substantially preventing passage of the fluid which contained the entrained bubbles. The selection of the gap width depends upon the properties of the fluid introduced into the main chamber, such as viscosity and specific gravity. Thus, for example, the dimension of the gaps 20, 21 and 24 is preferably from about 0.05 mm to 0.3 mm and, more preferably, from about 0.1 mm to 0.2 mm, when the fluid comprises a water-based fluid. When the fluid comprises an oil-based fluid, the dimension of the gaps 20, 21 and 24 is preferably from about 0.2 mm to 1 mm and, more preferably, from about 0.5 mm to 0.8 mm.

According to the present invention, when the internal pressure in the main chamber 1c of the main body 1 increases, the float member 17 is raised by the increased pressure, and the upper plate 19 moves away from the upper surface portion 13a of the block member 13 and opens the upper open end 12b of the through-hole 12 to allow bubbles which gather at the upper portion of the inflow space 2 to pass through the through-hole 12 and be discharged from the discharge outlet 8 via the gaps 20 and 24 (FIG. 3(B)). However, when the pressure is so large that the fluid spouts through the through-hole 12, the float member 17 is immediately raised upwardly until an upper surface 19b of the upper plate 19 abuts an inner upper surface 9b of the valve chamber 9 to close the discharge outlet 8 and prevent the fluid from flowing out the discharge outlet 8 (FIG. 3(C)). Thus, in a condition in which the internal pressure in the main chamber 1c is sufficient to cause the float member 17 to move away from the block member 13 but not sufficient to bring the upper surface 19b of the upper plate 19 into abutment with the inner upper surface 9b of the valve chamber 9, only the bubbles are permitted to pass through the gaps 20 and 24 and be discharged from the discharge outlet 8. The range of movement of the float member 17 in this condition is preferably from about 1 mm to 5 mm and, more preferably, from about 1 mm to 3 mm as measured from the inner upper surface 9b of the valve chamber 9 to the upper surface 19b of the upper plate 19 of the float member 17.

The main body 1, the cover member 11, the block member 13, the float member 17, and the ring member 22 are preferably made from an appropriate synthetic resin material, such as a fluorine-based resin (e.g., synthetic fluorine-containing resins sold under the trademark TEFLON). Alternatively, these components can be made from an anti-corrosive metal material, such as stainless steel. In the embodiments described herein, the lower and upper surfaces 19a, 19b of the upper plate 19 of the float member 17 are generally flat. However, one or both of the lower surface 19a and the upper surface 19b of the upper plate 19 may have a protrusion (not shown) having an appropriate shape so that it fits with and closes the upper open end 12b of the through-hole 12 or the discharge outlet 8, respectively. Furthermore, if the case requires, an elastic member, such as an anticorrosive spring, may be disposed between the float member 17 and the discharge outlet 8 to control movement of the float member 17. However, such an elastic member is not required for operation of the bubble-removing apparatus according to the present invention.

FIGS. 3(A) to 3(C) illustrate the movement of the float member 17 during operation of the bubble-removing apparatus according to the present invention. In FIGS. 3(A)–3(C), the width of the gaps 20, 21 and 24 has been exaggerated to facilitate understanding of the movement of float member 17. FIG. 3(A) shows a state wherein even when the bubbles separated from the fluid rotating and flowing in the main body 1 gather at the upper portion of the inflow space 2 as described above, the internal pressure of the main chamber 1c has not been increased to a level such that it displaces the float member 17 upwardly. As the internal pressure is gradually increased, even light and small bubbles collect in the through-hole 12 of the block member 13 near the float member 17. The state of FIG. 3(A) is also obtained when a pump for supplying the fluid to the inflow port 5 is stopped. In this state, the float member 17 is seated on the block member 13 and the upper plate 19 of the float member 17 closes the upper open end 12b of the through-hole 2 (i.e., the float member 17 functions as a check valve).

When the bubbles which separate from the fluid gather at the upper portion of the inflow space 2 as described above and the internal pressure of the main chamber 1c is sufficiently increased, the float member 17 is forced by the increased pressure to move upwardly (FIG. 3(B)). By this upward movement of the float member 17, the bubbles pass through the through-hole 12, around the lower surface 19a of the upper plate 19 of the float member 17, through the narrow gap 24, along a lower edge of the float member 17, through the narrow gap 20 and are discharged from the discharge outlet 8. Furthermore, when the internal pressure in the narrow gap 20 increases to a predetermined level, the ring member 22 moves upward. Thus, bubbles which pass through the through-hole 12, around the lower surface 19a of the upper plate 19 of the float member 17, through the narrow gap 24, along a lower edge of the float member 17 can also pass through the narrow gap 21 and be discharged from the discharge outlet 8.

Since the internal pressure is thereby lowered, the float member 17 moves down to the position shown in FIG. 3(A), but when the internal pressure is raised again, the float member 17 moves upwardly as shown in FIG. 3(B) and the bubbles are discharged as described above. By repeating this operation, the float member 17 moves upwardly and downwardly in accordance with internal pressure fluctuations within the main chamber 1c. At this time, the bubbles function as a lubricant between the block member 13 and the float member 17, and the float member 17 can move smoothly. As a result, the internal pressure can be controlled, and the pulsation of the fluid flowing out from the discharge outlet 6 can be buffered. Furthermore, since the narrow gaps 20 and 24 are sufficiently narrow as mentioned above, the fluid can hardly pass therethrough, and substantially only bubbles are discharged from the discharge outlet 8.

When the internal pressure in the main chamber 1c becomes extremely high by an increase of the flow amount so that the fluid also passes through the through-hole 12 of the block member 13 and reaches the float member 17, the float member 17 is immediately raised by the pressure to the position where it contacts with the inner upper surface 9b of the valve chamber 9 and shuts the discharge outlet 8 (FIG. 3(C)). Accordingly, it is possible to prevent the fluid from flowing out from the discharge outlet 8.

EXAMPLES

According to the results of experiments, it is possible to use a bubble-removing apparatus which does not require additional equipment for the removal of bubbles from a liquid which undergoes a flow rate change of about 0.5 to 5.0 liters per minute. Furthermore, under the condition wherein bubbles are entrained continuously, the amount of the mixture of the bubbles and liquid to be discharged from the discharge outlet can be reduced to about 0.066% or less of the entire flow amount.

The effect of the removal of bubbles can be confirmed by measuring the count of an ultrasonic flow meter which is susceptible to the influence of bubbles.

As a measurement device, a level sensor and an ultrasonic flow meter were used in combination. The supply amount was adjusted to 5,500 cc per minute by the level sensor, and the count of the ultrasonic flow meter was measured when the supply was terminated in response to the adjustment.

The average count of the ultrasonic flow meter (i.e., the amount calculated as the flow amount (cc)) was 5,539 cc when the bubble-removing apparatus of the present invention was used, whereas it was 5,638 cc when a conventional bubble-removing method was used. Further, the dispersion of the count was ±2.1% when the bubble-removing apparatus of the present invention was used, whereas it was ±6.9% when a conventional method was used.

From this result, it was observed that when the bubble-removing apparatus of the present invention was used, the average count shows a difference of 0.7% against the adjusted value (5,500 cc), which is ¼ of the case where the apparatus of the present invention was not used. Thus the accuracy was improved by the present invention. Further, the dispersion of the count was about ⅓ of the case where the apparatus of the present invention was not used, and it was found that stable counts were recorded. Accordingly, the bubble-removing apparatus of the present invention effectively discharged the bubbles, and it was confirmed that this apparatus can be sufficiently used for the ultrasonic flow meter which is susceptible to the influence of bubbles as mentioned above.

Figure 7:
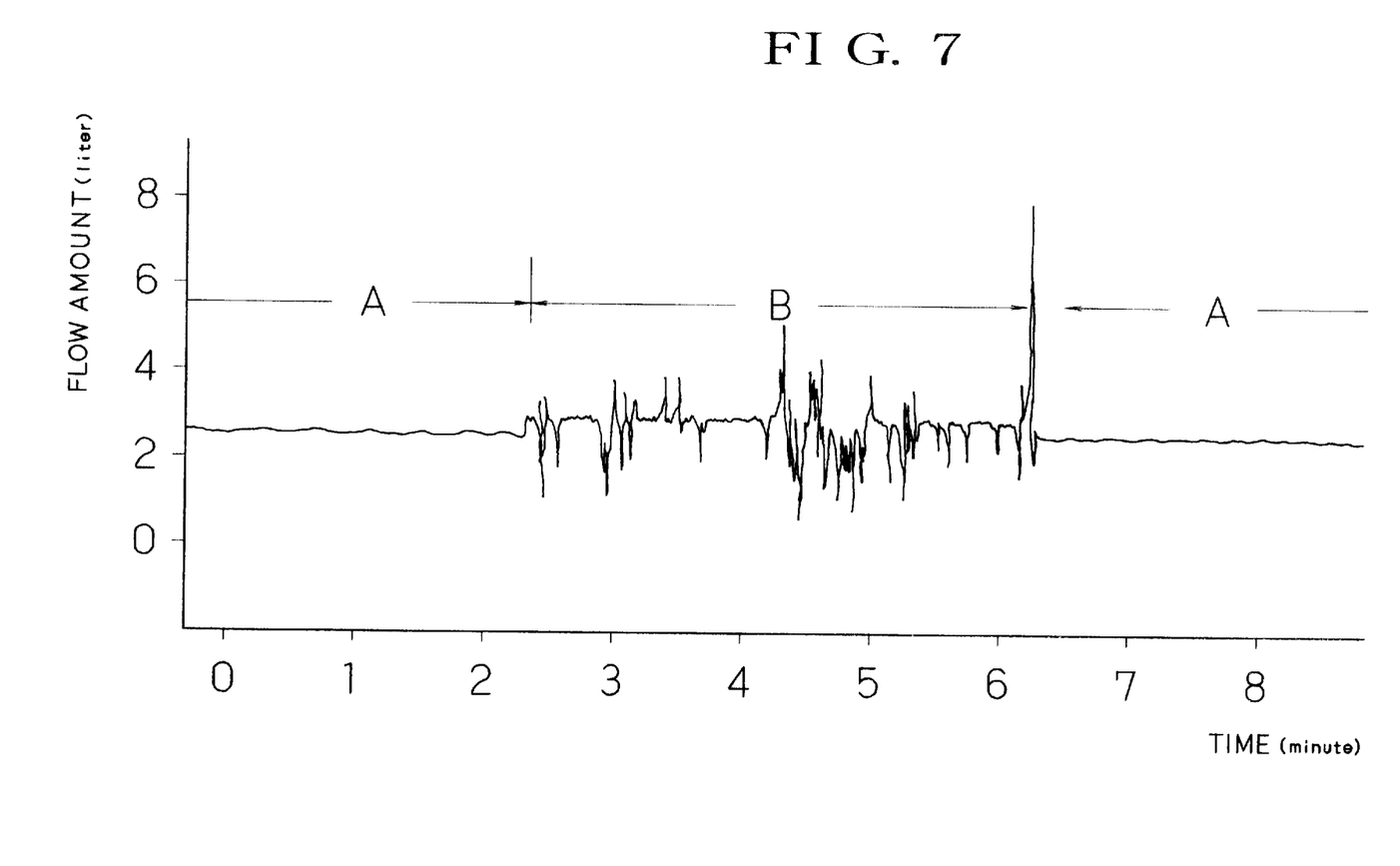
FIG. 7 is a graph showing the change of the flow amount between the case where the bubble-removing apparatus of the present invention is used and the case where it is not used.

FIG. 7 is a graph showing the change of flow rate when a liquid was supplied at a flow rate of 2.5 liters per minute using a diaphragm pump. As compared with the case where the liquid was passed through the bubble-removing apparatus of the present invention (A), a large pulsation is confirmed in the case where the liquid was not passed through the inventive apparatus (B).

The foregoing example confirmed that by the movement of the pressure-responsive float member 17, the internal pressure can be controlled, and the pulsation of the fluid flowing out from the discharge outlet 6 can be buffered. Furthermore, by the upward and downward movement of the ring member 22, the pulsations can be further buffered.

The bubble-removing apparatus of the present invention may appropriately be constructed with, for example, a suitable type of filter disposed in the main body 1 for removing dust particles accumulating in the main body, and an ON-OFF valve disposed at the outside of the discharge outlet 8 for controlling the discharge of bubbles. Additionally, a plurality of bubble-removing apparatuses according to the present invention can be continuously connected for removing bubbles in a stepwise manner.

According to the bubble-removing apparatus of the present invention, bubbles which gather around a central upper portion of the main body can be efficiently removed from the discharge outlet by the movement of the pressure-responsive float member. Furthermore, bubbles entrained in the fluid can be effectively removed regardless of the flow amount of the fluid or a fluctuation in the flow amount, while a mixture of bubbles and the fluid is hardly permitted to flow out. Additionally, the internal pressure in the main body can be controlled by movement of the pressure-responsive float member and pulsations can be buffered.

From the foregoing description, it can be seen that the present invention comprises an improved bubble-removing apparatus. It will be appreciated by those skilled in the art that obvious changes can be made to the embodiments described in the foregoing description without departing from the broad inventive concept thereof. It is understood, therefore, that this invention is not limited to the particular embodiments disclosed, but is intended to cover all obvious modifications thereof which are within the scope and the spirit of the invention as defiled by the appended claims.

What is claimed is:

1. A bubble-removing apparatus comprising:
    a main body having a central axis and a main chamber comprised of a first chamber portion, a second chamber portion, and a third chamber portion connecting the first chamber portion in fluid communication with the second chamber portion;
    a stationary rod disposed in the main chamber along the central axis;
    at least one inflow port disposed in the main body for introducing a fluid containing entrained bubbles tangentially into the main chamber so that the fluid is caused to rotate in the first, second and third chamber portions about the central axis to thereby cause the bubbles to separate from the fluid and collect around the rod;
    an outflow port disposed in the main body for discharging the fluid from which entrained bubbles have been separated;
    a discharge outlet for discharging the bubbles separated from the fluid;
    a valve chamber disposed between the discharge outlet and the first chamber portion of the main chamber;
    a block member disposed in the valve chamber and having a through-hole in fluid communication with the first chamber portion of the main chamber; and
    a float member disposed in the valve chamber for undergoing movement therein relative to the block member, the float member being disposed over the block member so that a first gap is formed between an outer surface of the block member and an inner surface of the float member and a second gap is formed between an outer surface of the float member and an inner surface of the valve chamber, the float member undergoing movement within the valve chamber in response to an increase in internal pressure of the main chamber to place the through-hole of the block member into and out of fluid communication with the discharge outlet through the first and second gaps to thereby control the discharge of bubbles from the discharge outlet.

2. A bubble-removing apparatus according to claim 1; wherein the first and third chamber portions are generally cylindrical-shaped and a diameter of the first chamber portion is greater than that of the third chamber portion.

3. A bubble-removing apparatus according to claim 2; wherein the second chamber portion has a generally inverted conical shape.

4. A bubble-removing apparatus according to claim 1; wherein the block member is generally cylindrical-shaped and is integral with a substrate for engaging an upper end of the first chamber portion.

5. A bubble-removing apparatus according to claim 1; wherein the float member comprises a cylindrical wall surrounding the block member and an upper plate closing an upper end of the cylindrical wall; wherein during movement of the float member within the valve chamber, the upper plate of the float member opens and closes an open end of the through-hole of the block member to place the discharge outlet into and out of fluid communication with the first chamber portion of the main chamber through the first and second gaps.

6. A bubble-removing apparatus according to claim 5; wherein the cylindrical wall of the float member has an inner diameter greater than an outer diameter of the block member so that the first gap is formed between the outer surface of the block member and the inner surface of the float member.

7. A bubble-removing apparatus according to claim 1; further comprising a ring member disposed in the valve chamber and between the outer surface of the float member and an inner surface of the valve chamber so that the second gap is disposed between the outer surface of the float member and an inner surface of the ring member and so that a third gap is formed between an outer surface of the ring member and the inner surface of the valve chamber; wherein the ring member undergoes movement within the valve chamber in response to a change in internal pressure in the second gap.

8. A bubble-removing apparatus according to claim 7; wherein a width of each of the first, second and third gaps in the diametrical direction thereof is selected so that the bubbles separated from the fluid can effectively pass therethrough without passing the fluid.

9. A bubble-removing apparatus according to claim 8; wherein the fluid containing entrained bubbles comprises a water-type fluid; and wherein the width of each of the first, second and third gaps is from about 0.05 mm to 0.3 mm.

10. A bubble-removing apparatus according to claim 8; wherein the fluid containing entrained bubbles comprises a water-type fluid; and wherein the width of each of the first, second and third gaps is from about 0.1 mm to 0.2 mm.

11. A bubble-removing apparatus according to claim 8; wherein the fluid containing entrained bubbles comprises an oil-type fluid; and wherein the width of each of the first, second and third gaps is from about 0.2 mm to 1 mm.

12. A bubble-removing apparatus according to claim 8; wherein the fluid containing entrained bubbles comprises a oil-type fluid; and wherein the width of each of the first, second and third gaps is from about 0.5 mm to 0.8 mm.

13. A bubble-removing apparatus according to claim 1; wherein a width of each of the first and second gaps in the diametrical direction thereof is selected so that the bubbles separated from the fluid can effectively pass therethrough without passing the fluid.

14. A bubble-removing apparatus according to claim 13; wherein the fluid containing entrained bubbles comprises a water-type fluid; and wherein the width of each of the first and second gaps is from about 0.05 mm to 0.3 mm.

15. A bubble-removing apparatus according to claim 13; wherein the fluid containing entrained bubbles comprises a water-type fluid; and wherein the width of each of the first and second gaps is from about 0.1 mm to 0.2 mm.

16. A bubble-removing apparatus according to claim 13; wherein the fluid containing entrained bubbles comprises an oil-type fluid; and wherein the width of each of the first and second gaps is from about 0.2 mm to 1 mm.

17. A bubble-removing apparatus according to claim 13; wherein the fluid containing entrained bubbles comprises a oil-type fluid; and wherein the width of each of the first and second gaps is from about 0.5 mm to 0.8 mm.

18. A bubble-removing apparatus according to claim 1; wherein the float member comprises a cylindrical wall surrounding the block member and an upper plate closing an upper end of the cylindrical wall.

19. A bubble-removing apparatus according to claim 18; wherein a range of movement of the float member within the valve chamber is limited by a distance between an upper surface portion of the block member and an inner upper surface of the valve chamber; wherein when fluid does not enter the through-hole of the block member from the first chamber portion of the main chamber, a lower surface of the upper plate of the float member abuts the upper surface portion of the block member to close an open end of the through-hole of the block member to thereby block the discharge outlet from fluid communication with the first chamber portion of the main chamber; wherein when fluid enters the through-hole of the block member, pressure generated by the fluid causes the float member to move away from the block member to open the open end of the through-hole of the block member and place the discharge outlet in fluid communication with the first chamber portion of the main chamber through the gaps; and wherein when the pressure generated by the fluid is higher than a preselected pressure, the float member is caused to move away from the block member until an upper surface of the upper plate of the float member abuts the inner upper surface of the valve chamber and closes the discharge outlet.

20. A bubble-removing apparatus according to claim 19; wherein a distance between the upper surface portion of the block member and the inner upper surface of the valve chamber is selected so that when the upper surface of the upper plate of the float member abuts the inner upper surface of the valve chamber, the float member does not come away from the block member.

21. A bubble-removing apparatus according to claim 19; wherein in the condition in which the pressure generated by the fluid is not higher than the preselected pressure and the pressure causes the float member to move away from the block member to open the open end of the through-hole of the block member and place the discharge outlet in fluid communication with the first chamber portion of the main chamber through the gaps, bubbles separated from the fluid are permitted to pass through the first and second gaps and discharge through the discharge outlet.

22. A bubble-removing apparatus according to claim 21; wherein a range of movement of the float member in said condition is from 1 mm to 5 mm as measured from the inner upper surface of the valve chamber to the upper surface of the upper plate of the float member.

23. A bubble-removing apparatus according to claim 21; wherein a range of movement of the float member in said condition is from 1 mm to 3 mm as measured from the inner upper surface of the valve chamber to the upper surface of the upper plate of the float member.

24. A bubble-removing apparatus comprising:
a main body having a main chamber;
means for introducing a fluid containing entrained bubbles into the main chamber and for causing the fluid to rotate about a central axis of the main chamber so that the entrained bubbles are caused to separate from the fluid and collect around the central axis;
an outflow port disposed in the main body for discharging the fluid from which entrained bubbles have been separated;
a discharge outlet for discharging the bubbles separated from the fluid;
a valve chamber disposed between the discharge outlet and the main chamber of the main body;
a block member disposed in the valve chamber and having a through-hole in fluid communication with the main chamber of the main body; and
a float member disposed in the valve chamber for undergoing movement therein relative to the block member, the float member being disposed over the block member so that a plurality of gaps are formed between the block member, the float member and the valve chamber, the float member undergoing movement within the valve chamber in response to internal pressure changes within the main chamber to place the through-hole of the block member into and out of fluid communication with the discharge outlet through the plurality of gaps to thereby control the discharge of the separated bubbles from the discharge outlet.

25. A bubble-removing apparatus according to claim 24; wherein the introducing means includes means for introducing the fluid in the main chamber in a tangential direction of the main chamber.

26. A bubble-removing apparatus according to claim 24; further comprising a cover member connected to an upper end of the main body and having the valve chamber.

27. A bubble-removing apparatus according to claim 26; wherein the discharge outlet is formed in the cover member and has a central axis coincident with the central axis of the main chamber of the main body.

28. A bubble-removing apparatus according to claim 26; wherein the block member has a base disposed between the cover member and the upper end of the main body.

29. A bubble-removing apparatus according to claim 26; wherein the block member is formed in one piece with the cover member.

30. A bubble-removing apparatus according to claim 29; further comprising a fixing plate connected the cover member; and wherein the discharge outlet is formed in the fixing plate and has a central axis coincident with the central axis of the main chamber of the main body.

31. A bubble-removing apparatus according to claim 24; further comprising a stationary rod disposed in the main chamber along the central axis of the main chamber; wherein the introducing means includes means for introducing the fluid containing entrained bubbles into the main chamber and for causing the fluid to rotate about the central axis of the main chamber so that the entrained bubbles are caused to separate from the fluid and collect around the stationary rod.

32. A bubble-removing apparatus according to claim 24; wherein the introducing means comprises at least one inflow port disposed in the main body for introducing the fluid containing entrained bubbles tangentially into the main chamber.

33. A bubble-removing apparatus according to claim 32; wherein the at least one inflow port comprises a plurality of inflow ports disposed in the main body.

* * * * *